Dec. 20, 1955   E. J. TOMS   2,727,728

ROCK DRILL BIT

Filed March 15, 1954

INVENTOR.
Ernest J Toms
BY
Alex. E. MacRae
Attorney.

United States Patent Office 2,727,728
Patented Dec. 20, 1955

2,727,728
ROCK DRILL BIT

Ernest J. Toms, Crowland Township, Ontario, Canada

Application March 15, 1954, Serial No. 416,333

2 Claims. (Cl. 255—63)

This invention relates to rock drill bits.

An object of the invention is to provide a rock drill bit having a cutting edge length greatly increased with respect to bits heretofore proposed, such bit having thereby greatly increased operating life with additional strength and cutting power whereby the gauge of the hole produced is always fully maintained.

Figure 1:
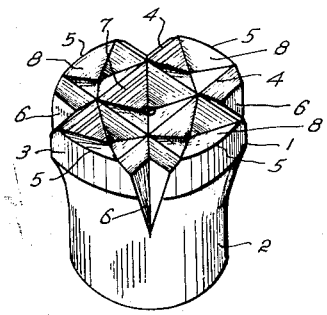
Figure 3:
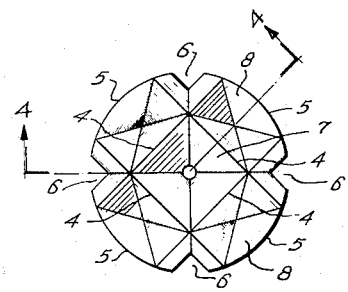
Figure 2:
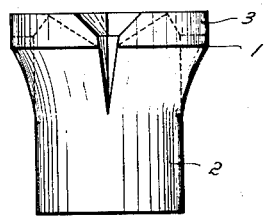
Figure 4:
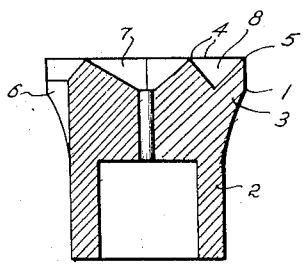

The invention will be described with reference to the accompanying drawing, in which Figure 1 is a perspective view of a bit in accordance with the invention, Figure 2 is a side elevation of the bit, Figure 3 is a plan view of the bit, and Figure 4 is a sectional elevation on line 4—4 of Figure 3.

Referring to the drawing, the bit 1 is of detachable type and comprises a socket portion 2 and enlarged cutting head 3.

The cutting head comprises a plurality (four as shown) of symmetrically arranged straight chordal non-radial cutting edges 4 each formed in conventional manner by a pair of inclined surfaces, as shown. Preferably, there are two pairs of parallel cutting edges, each such cutting edge intersecting both cutting edges of the other pair. Preferably, also, the adjacent ends of each pair of cutting edges 4 are joined by an arcuate cutting edge 5, formed by an inclined surface terminating at the periphery of the head. There is thus provided a plurality (four as shown), of arcuate cutting edges 5 lying on the circumference of the same circle. Between each adjacent pair of cutting edges 5 is provided a V-shaped notch 6 for escape of loose material.

It will be observed that provision of the cutting edges described results in the formation of a central concave or pyramidal recess 7 and a plurality of circumferentially disposed concave or pyramidal recesses 8.

It will be apparent that the bit described has a cutting edge length at least twice as great as that of conventional radial cutting edge bits. Moreover, since the cutting edges of the present invention are distributed symmetrically and uniformly about the face of the cutting head, the operating effectiveness and strength of the bit is increased, the operating life of the bit is extended, and the gauge of the hole produced by the bit is more effectively maintained. It will be further observed that the present bit eliminates the usual radially protruding single cutting edge wings on conventional bits which are subject to frequent fracture.

What is claimed is:

1. A rock drill bit comprising a cutting head having inclined surfaces forming a plurality of pairs of straight chordally extending non-radial parallel cutting edges, each said cutting edge extending continuously from a point on the periphery of said head to another point on the periphery of said head, each said cutting edge of one of said pairs intersecting both cutting edges of another of said pairs at a point intermediate the ends thereof, and means forming an arcuate cutting edge joining the ends of the cutting edges of each said pair.

2. A rock drill bit as defined in claim 1, said cutting head having a notch for escape of loosened material between the ends of each adjacent pair of said arcuate cutting edges.

References Cited in the file of this patent

UNITED STATES PATENTS 1,571,348    Stee _____ Feb. 2, 1926

OTHER REFERENCES

Mine & Quarry, August 1917 pages 994 and 995.